United States Patent [19]

Vreeland et al.

[11] Patent Number: 5,554,474
[45] Date of Patent: Sep. 10, 1996

[54] CONDUCTIVE SUBSTRATE BEARING A ELASTOMERIC POLYURETHANE COATING CONTAINING A CONDUCTIVITY CONTROL AGENT

[75] Inventors: William B. Vreeland, Webster; John C. Wilson; Mark C. Zaretsky, both of Rochester, all of N.Y.

[73] Assignee: Eastman Kodak Company, Rochester, N.Y.

[21] Appl. No.: 268,601

[22] Filed: Jun. 30, 1994

[51] Int. Cl.$^6$ ....................................................... G03G 15/04
[52] U.S. Cl. .................. 430/66; 430/67; 430/62; 430/132; 428/423.1; 528/51; 528/66
[58] Field of Search .................. 430/60, 62, 64, 430/61, 63, 65, 66, 67, 132; 428/423.1; 528/51, 66

[56] References Cited

U.S. PATENT DOCUMENTS

| | | |
|---|---|---|
| 2,807,233 | 9/1957 | Fitch . |
| 3,520,604 | 7/1970 | Shelffo . |
| 3,702,482 | 11/1972 | Dolcimascolo et al. . |
| 3,781,105 | 12/1973 | Meagher . |
| 3,920,325 | 11/1975 | Swift . |
| 3,959,573 | 5/1976 | Eddy et al. . |
| 3,959,574 | 5/1976 | Seanor et al. . |
| 4,062,812 | 12/1977 | Safford et al. . |
| 4,116,894 | 9/1978 | Lentz et al. . |
| 4,729,925 | 3/1988 | Chen et al. . |
| 4,762,941 | 8/1988 | Chen et al. . |
| 5,011,739 | 4/1991 | Nielsen et al. . |
| 5,212,032 | 5/1993 | Wilson et al. . |

Primary Examiner—George F. Lesmes
Assistant Examiner—Laura Weiner
Attorney, Agent, or Firm—Willard G. Montgomery

[57] ABSTRACT

A member for electrically cooperating with a conductive support surface to attract charged toner particles from the surface towards the member is disclosed. The member comprises a conductive substrate capable of supporting a uniform bias potential thereon and at least one coating comprising a resilient elastomeric polyurethane. The polyurethane is formed by reacting:

(a) a polyisocyanate prepolymer and
(b) a hardening mixture comprising:
 (i) a polyol and,
 (ii) as a conductivity control agent in the form of a phosphonium tetrahaloferrate salt represented by the formula:

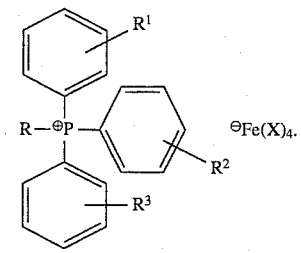

16 Claims, 1 Drawing Sheet

CONDUCTIVE SUBSTRATE BEARING A ELASTOMERIC POLYURETHANE COATING CONTAINING A CONDUCTIVITY CONTROL AGENT

FIELD OF THE INVENTION

This invention relates generally to the field of electrostatography. More particularly, the invention relates to electrically biasable transfer members for use in electrostatographic transfer processes for transferring toner images from one surface to another and to methods for their preparation.

BACKGROUND OF THE INVENTION

In electrostatography, an image comprising an electrostatic field pattern, usually of non-uniform strength, (also referred to as an electrostatic latent image) is formed on an insulative surface of an electrostatographic element by any of various methods. For example, the electrostatic latent image may be formed electrophotographically (i.e., by imagewise photo-induced dissipation of the strength of portions of an electrostatic field of uniform strength previously formed on a surface of an electrophotographic element comprising a photoconductive layer and an electrically conductive substrate), or it may be formed by dielectric recording (i.e., by direct electrical formation of an electrostatic field pattern on a surface of a dielectric material). Typically, the electrostatic latent image is then developed into a toner image by contacting the latent image with charged toner particles. If desired, the toner image can then be transferred to a final support material or receiver such as a web or sheet of paper and affixed thereto to form a permanent record of the original.

Historically, transfer of the toner images between support surfaces in electrostatographic applications has been accomplished via electrostatic induction using a corotron or other corona generating device. In corona induced transfer systems, the final support sheet is placed in direct contact with the toner image while the image is supported on the photoconductive surface. Transfer is induced by spraying the back of the support sheet with a corona discharge having a polarity opposite that of the toner particles, thereby electrostatically transferring the toner particles to the sheet. Exemplary corotron ion emission transfer systems are disclosed in U.S. Pat. Nos. 2,807,233 and 2,836,725.

The corotron system is relatively simple. The charges deposited electrostatically tack the final support material, such as copy paper, to the original toner support, such as the photoconducter, in addition to creating the desired electrical field affecting transfer of the toner to the paper. However, the strong attraction between the paper and the original toner support makes it mechanically difficult to separate the two supports. Further, although such a system has been proven to be useful for transferring a single toner image to a final support sheet, i.e., an image that is created by means of a single exposure and developing step, corona induced transfer does not lend itself readily for use in systems where a multiplicity of toner images must be sequentially transferred to a single support sheet as exemplified by many electrostatographic color and duplexing systems.

More recently, transfer of developed images from the photoconductor to the final support material has been attempted with the aid of a biased transfer member, such as a biased transfer roll or roller, as a means of controlling the forces acting on the toner during transfer and of avoiding the severe tacking problems encountered with the use of the corona induction system. A bias transfer member is a member for electrically cooperating with a conductive support surface to attract electrically charged particles from the support surface towards the member. The first such bias transfer roll was disclosed by Fitch in U.S. Pat. No. 2,807,233, where a metal roll coated with a resilient coating having a resistivity of at least $10^6$ ohm cm was used as the bias transfer member. Because of the resistivity of the coating, however, the amount of bias that could be applied to the roll was limited to rather low operating values because at higher ranges the air in and about the transfer zone began to break down or ionize causing the image to degrade during transfer. Nevertheless, bias roll transfer has become the transfer method of choice currently used in electrostatographic copying systems and apparatus since the use of a bias transfer roll generally avoids the severe tacking problems which are encountered when the corona induction system is utilized.

For example, Shelffo, in U.S. Pat. No. 3,520,604, discloses a transfer roll made of a conductive rubber having a resistivity in the range of $10^{11}$ to $10^{16}$ ohm cm. Here, in order to give the roll the needed resiliency required in most practical applications, it is reported that the coating must be relatively thick. A thick coating of high resistivity, however, acts to build up a surface charge on the roll resulting in air break down in the transfer region and eventually copy degradation.

More recently, improved bias transfer members have been disclosed which reportedly have overcome many of the electrical and image degradation problems associated with some of the previous transfer techniques.

Dolcimascolo et al, for example, in U.S. Pat. No. 3,702,482, disclose a multiple layer transfer roll member for transferring xerographic images under controlled conditions. The member is capable of electrically cooperating with a conductive support surface to attract charged toner particles from the support surface towards the member or towards a transfer material such as paper positioned therebetween. The member comprises a conductive substrate for supporting a biased potential thereon, an intermediate blanket (primary layer) placed in contact with the substrate to the outer periphery of the blanket and a relatively thin outer coating (secondary layer) placed over the blanket layer having an electrical resistivity to minimize ionization of the atmosphere when the transfer member is placed in electrical cooperation with the image support surface.

Meagher, in U.S. Pat. No. 3,781,105 discloses a similar transfer member employed in conjunction with a variable electrical bias means for regulating automatically the electrical field levels at various points on the transfer member during the transfer operation and providing constant current control.

In the preferred embodiment, the transfer members disclosed in U.S. Pat. No. 3,702,482 and U.S. Pat. No. 3,781,105, consist of a roll or roller having a central biasable conductive core further having an intermediate blanket or electrically "relaxable" layer (primary layer) surrounding and in electrical contact with the core, and further having a second blanket or electrically "self-leveling" outer layer (secondary layer) surrounding and in electrical contact with the primary layer. Under operating conditions, it is desirable for optimal image transfer to maintain a relatively constant current flow of less than about 30 micro amps in the nip area between the transfer roll surface, the transfer material and the photoconductive surface from which a developed image is to be transferred. For this condition to exist at given potentials, the resistivity of the primary and secondary layers must be within critical values and preferably be relatively constant under normally anticipated extremes of operating conditions. Preferably, it has been found that the primary layer should be a resilient elastomeric material such as a polyurethane having a volume resistivity within the range of $10^7$ to less than $10^{11}$ ohm cm, and the secondary layer should also be a resilient material such as a polyurethane having a volume resistivity within the range of $10^{11}$ to $10^{15}$ ohm cm.

In practice, it has been found that the elastomeric polyurethane materials which are used in these transfer members, and which exhibit resistivities within the above ranges, or the resistivities of which can be adjusted or controlled to within the above ranges, are moisture sensitive such that the resistivity may vary by as much as a factor of 50 between 10% and 80% relative humidity as a function of the amount of moisture absorbed from or lost to the surrounding atmosphere. For example, in the case of the polyurethane materials which are employed as the primary layer and which have exceptionally good electrical characteristics, the volume resistivity may change from $10^{11}$ ohm cm at low moisture contents, i.e., less than about 0.1% moisture, to $10^9$ ohm cm at higher moisture levels, i.e., about 2.5% moisture. Other polyurethanes suitable for use as the secondary layer exhibit resistivity variations from about $10^{15}$ to $10^{13}$ ohm cm as a function of increasing moisture content. The consequent variations in resistivity due to relative humidity effects will ordinarily give rise to erratic performance of the transfer member from day to day, particularly in terms of transfer efficiency, i.e., the quality of the image transferred unless compensated for by a concomitant change in the voltages sufficient to maintain a constant nip current as disclosed by Meagher, in U.S. Pat. No. 3,781,105.

Several attempts have been made to control both the resistivity of such materials to within the critical ranges necessary for optimal image transfer and, at the same time, to reduce the moisture sensitivity of such materials to changes in relative humidity so that the resistivity of the materials remains relatively constant within the ranges required for optimal image transfer.

Chen et al, for example, in U.S. Pat. No. 4,729,925 and U.S. Pat. No. 4,742,941 disclose, as coating materials for biasable transfer members, polyurethane elastomers made from certain polyisocyante prepolymers and polyols in which the resistivity can be maintained between $1.0\times10^9$ and $1.0\times10^{11}$ ohm cm by copolymerizing with the polyisocyanate prepolymers and polyol hardening compounds used to make the polyurethane elastomers certain polyol charge control agents formed from certain metal salts complexed with particular polyester diols such as, for example, bis [oxydiethylenebis(polycaprolactone)yl]5-sulfo-1,3-benzenedicarboxylate, methyltriphenylphosphonium salt. The polyurethane elastomers of Chen et al, however, are moisture sensitive. Reference to curve 2 in FIG. 2 of U.S. Pat. No. 4,729,925, indicates, for example, that the volume resistivity of the conductive polyurethane elastomer of Example 15 prepared from a commercial polyurethane mix and the polyol charge control agent of Example 10 therein, i.e., bis[oxydiethylenebis(polycaprolactone)yl]-5-sulfo-1,3-benzenedicarboxylate, methyltriphenylphosphonium salt, decreased by a factor of about 6.5 when the relative humidity changed from 25% to about 85%.

Thus, it can be seen that there still remains a need in the art for a biasable transfer member capable of electrically cooperating with a conductive support surface to attract charged toner particles towards the member or towards a transfer material such as a sheet of paper positioned between the member and the conductive support in which the resistivity not only can be controlled or adjusted to within a specific range necessary for optimal image transfer, but also one in which the resistivity is substantially insensitive to widely varying changes in relative humidity encountered during normal operating conditions such that the resistivity remains relatively constant within the range required for optimal image transfer. The present invention provides such a biasable transfer member and methods for making same.

SUMMARY OF THE INVENTION

The present invention provides a biasable transfer member, that is, a member capable of electrically cooperating with a conductive support surface to attract charged toner particles from the support surface towards the member. The biasable transfer member comprises a conductive substrate capable of supporting a uniform bias potential thereon and at least one coating comprising a resilient elastomeric polyurethane formed by reacting:

(a) a polyisocyanate prepolymer comprising the reaction product of:
  (i) a saturated aliphatic polyisocyanate, a saturated cycloaliphatic polyisocyanate or an aromatic polyisocyanate; and
  (ii) a polyol free of aliphatic unsaturation; and (b) a hardening mixture comprising:
  (i) a polyol of (a)(ii) or a diamine free of aliphatic unsaturation, or a mixture thereof; and,
  (ii) as a conductivity control agent for controlling the resistivity of the elastomeric polyurethane, from 0.001 to 5.0 weight percent, based on the total weight of the polyurethane, of a phosphonium tetrahaloferrate salt represented by the formula:

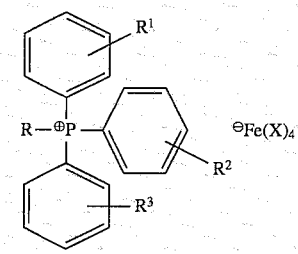

wherein
R is selected from an unsubstituted alkyl group having from 1 to 24 carbon atoms; a substituted alkyl group having from 1 to 24 carbon atoms substituted with one or more hydroxy-, alkoxy-, carboalkoxy-, nitro-, cyano-, keto- or halo-groups; a cycloalkyl group having from 3 to 7 carbon atoms; an alkaryl group having from 1 to 20 carbon atoms in the alkyl group and 6 to 14 carbon atoms in the aryl group; an aralkyl group having from 1 to 4 carbon atoms in the alkyl group and 6 to 14 carbon atoms in the aryl group wherein the aryl group is substituted with one or more alkyl groups containing from 1 to 18 carbon atoms, one or more alkoxy groups containing from 1 to 12 carbon atoms, one or more hydroxy-, halo-, cyano-, amino-, or nitro-groups or phenyl;

$R^1$, $R^2$ and $R^3$, which can be the same or different, are independently selected from hydrogen; an unsubstituted alkyl group having from 1 to 24 carbon atoms; a substituted alkyl group having from 1 to 24 carbon atoms substituted with one or more hydroxy groups, alkoxy groups containing from 1 to 12 carbon atoms, carboalkoxy groups containing from 1 to 12 carbon atoms, acyloxy groups containing from 1 to 12 carbon atoms, nitro-, cyano-, keto- or halo-groups; and X, which can be the same or different, is independently selected from fluorine, chlorine, bromine or iodine, the coating being in electrical contact with the conductive substrate and having an electrical resistivity such that the coating is capable of transmitting a bias potential from the substrate to the outer periphery of the coating.

Since the conductivity control agent disclosed and described herein functions to control or alter the resistivity of the elastomeric polyurethane into which it is incorporated, the invention also provides, in another embodiment, a method of controlling the resistivity of a member for electrically cooperating with a conductive support surface, such as a photoconductive surface, to attract charged toner particles from the surface towards the member, which method comprises coating a conductive substrate capable of supporting a uniform bias potential thereon with at least one coating of a resilient elastomeric polyurethane, wherein the coating is in electrical contact with the conductive substrate and is formed by reacting:

(a) a polyisocyanate prepolymer comprising the reaction product of:
  (i) a saturated aliphatic polyisocyanate, a saturated cycloaliphatic polyisocyanate or an aromatic polyisocyanate; and
  (ii) a polyol free of aliphatic unsaturation; and
(b) a hardening mixture comprising:
  (i) a polyol of (a)(ii) or a diamine free of aliphatic unsaturation or a mixture thereof; and,
  (ii) as a conductivity control agent to alter the resistivity of the elastomeric polyurethane, from 0.001 to 5.0 weight percent, based on the total weight of the polyurethane, of a phosphonium tetrahaloferrate salt represented by the formula:

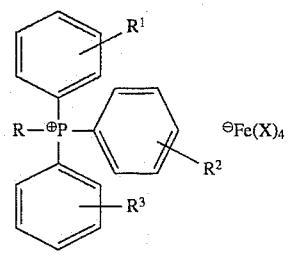

wherein
R is selected from an unsubstituted alkyl group having from 1 to 24 carbon atoms; a substituted alkyl group having from 1 to 24 carbon atoms substituted with one or more hydroxy-, alkoxy-, carboalkoxy-, nitro-, cyano-, keto- or halo-groups; a cycloalkyl group having from 3 to 7 carbon atoms; an alkaryl group having from 1 to 20 carbon atoms in the alkyl group and 6 to 14 carbon atoms in the aryl group; an aralkyl group having 1 to 4 carbon atoms in the alkyl group and 6 to 14 carbon atoms in the aryl group wherein the aryl group is substituted with one or more alkyl groups containing from 1 to 18 carbon atoms, one or more alkoxy groups containing from 1 to 12 carbon atoms, one or more hydroxy-, halo-, cyano-, amino-, or nitro-groups; or phenyl;

$R^1$, $R^2$ and $R^3$, which can be the same or different, are independently selected from hydrogen; an unsubstituted alkyl group having from 1 to 24 carbon atoms; a substituted alkyl group having from 1 to 24 carbon atoms substituted with one or more hydroxy groups, alkoxy groups containing from 1 to 12 carbon atoms, carboalkoxy groups containing from 1 to 12 carbon atoms, acyloxy groups containing from 1 to 12 carbon atoms, nitro-, cyano-, keto- or halo-groups; and X, which can be the same or different, is independently selected from fluorine, chlorine, bromine or iodine, whereby the elastomeric polyurethane having an altered resistivity is capable of transmitting a bias potential from the substrate to the outer periphery thereof.

By the use of the term "bias transfer member" or "bias transfer roll", is meant a member or roll for electrically cooperating with a conductive support surface to attract electrically charged particles from the support surface towards the member. In particular, a bias transfer roll is one which electrically cooperates with a photoconductive plate or photoconductor, when brought into contact therewith, to attract charged toner particles from the plate in the direction of the roll. In this manner, the developed images are transferred from the photoconductor to a final support material, such as paper or the like.

Important advantages of the polyurethane coatings of the biasable transfer members of the invention are that they possess the capability to retain pre-established levels of resistivity and exhibit enhanced moisture insensitivity.

DESCRIPTION OF THE PREFERRED EMBODIMENTS

Figure 1:
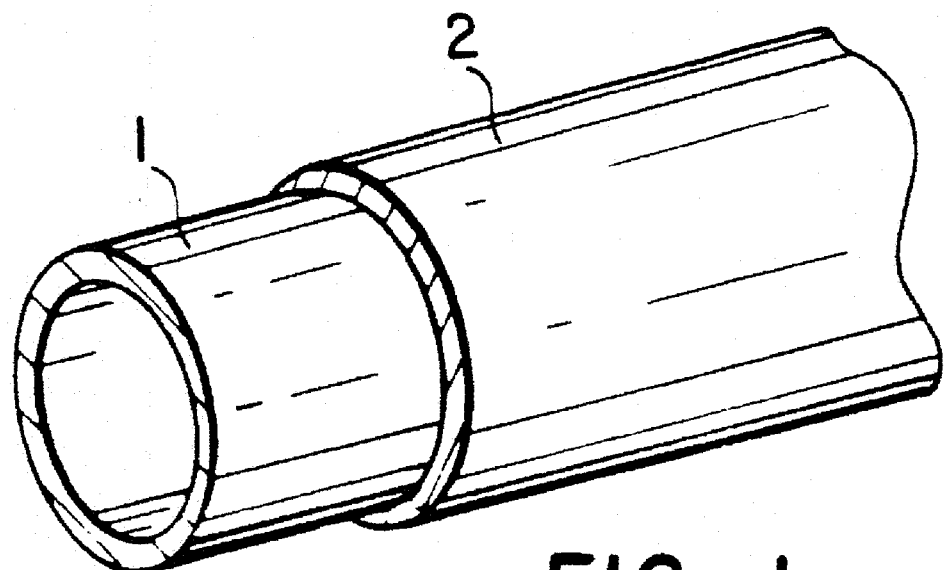
FIG. 1 is a perspective view in partial section showing the construction of a biasable transfer roll of the present invention.

The biasable transfer members of the present invention have application in any suitable electrostatographic device such as, for example, an electrophotographic device, in which a transfer member, more particularly, a bias transfer roll, is used for electrically cooperating with a photoconductive element, plate or surface when brought into contact therewith to attract toner particles bearing an electrostatic charge on the element or plate toward the roll. Transfer is accomplished, as in the prior art, by feeding a sheet of transfer material into the nip region formed by the surface of the transfer roll and the surface of a photoconductive insulating material or element bearing a developed image and imposing a potential on the transfer roll sufficient to cause the transfer of the toner particles or material from the surface of the photoconductive insulating material or element to the adjacent surface of the transfer material. In practice, any source of electrical power connected to the central conductive core of the transfer roll and capable of placing the transfer roll member at a potential sufficient to attract toner images from the photoconductive insulating surface toward the roll may be employed. A more complete discussion of the principles and configurations involved in bias roll transfer may be found in U.S. Pat. Nos. 2,951,443; 3,620,616; 3,633,543; 3,781,105; or 3,708,482.

Referring specifically to FIG. 1, there is shown a cut-away view of a transfer member illustrating the internal construction thereof. The transfer member is in the form of a roll and is basically formed upon a rigid hollow cylinder 1 that is fabricated of a conductive metal, such as aluminum, copper or the like, capable of readily responding to a biasing potential placed thereon. Over core 1 is placed a coating 2 which is a crosslinked or non-crosslinked elastomeric polyurethane containing a conductivity control agent capable of altering or controlling the resistivity of the polyurethane to within a preferred resistivity range consistent with optimal image transfer.

Outer coating 2 which is formed of the resilient elastomeric material can be designed to have a hardness of between about 20 Shore A to about 80 Shore D, and preferably about 15–100 Shore A and may be about 0.050 inch (0.127 cm) to about 0.625 inch (1.58 cm) in thickness, preferably about 0.30 inch (0.762 cm) in thickness, having sufficient resiliency to allow the roll to deform when brought into moving contact with a photoconductive drum surface to provide an extended contact region in which the toner particles can be transferred between the contacting bodies. The elastomeric polyurethane coating should be capable of responding rapidly to the biasing potential to impart electrically the charge potential on the core to the outer extremities of the roll surface. It is preferred that the polyurethane coating have a resistivity of from about $1.0 \times 10^6$ to about $5.0 \times 10^{11}$ ohm cm, and, more preferably, from about $2.0 \times 10^8$ to about $2.0 \times 10^{10}$ ohm cm, as this has been found to be most consistent with optimal image transfer. This is achieved by including in the crosslinked or non-crosslinked polymeric network of the polyurethane elastomer, the conductivity control agent of the present invention. As a result, a permanent, or at the very least, a relatively constant degree of resistivity is imparted to the polyurethane elastomer that will not change substantially over time during the course of normal operations. In accordance with the present invention, the coating of the conductive substrate must be formulated of at least one layer of an elastomeric polyurethane having a conductivity control agent capable of altering and/or controlling the resistivity of the elastomer to within the preferred or desired resistivity range. By coating the biasable transfer member with these particular polyurethane elastomers containing the conductivity control agents of the invention, the resistivity of the biasable transfer member is controlled and, in addition, the sensitivity of the resistivity of the biasable transfer member also is controlled in relationship to changes in relative humidity. Thus, the resistivity of the elastomeric polyurethanes having conductivity control agents to control the resistivity of the polyurethanes used as the outer coating of the bias transfer member of FIG. 1 is less sensitive to changes in relative humidity than the same elastomeric polyurethanes which are not treated with such agents. Examples of the elastomeric crosslinked or non-crosslinked polyurethane materials having conductivity control agents included in the crosslinked or non-crosslinked polymeric networks thereof as an integral part of the polyurethane material in the manner described in accordance with the invention to control the resistivity of the elastomer and hence the biasable transfer member are set forth below.

The polyurethane elastomers which can be used in accordance with the present invention are known polyurethane elastomers which are made from known starting materials using methods which are well known in the art for making polyurethane elastomers plus the conductivity control agents described herein. The conductivity control agents comprise certain phosphonium tetrahaloferrate salts to impart conductivity to the elastomers.

The polyurethane elastomers are the chemical reaction products of (a) polyisocyanate prepolymers formed from an isocyanate (specifically a saturated aliphatic polyisocyanate, a saturated cycloaliphatic polyisocyanate, or an aromatic polyisocyanate) reacted with a polyol free of aliphatic unsaturation, and (b), a hardener composition comprising a polyol, as previously described, or a diamine free of aliphatic unsaturation, or a mixture thereof and an amount of the conductivity control agent described hereinbefore sufficient to control the resistivity of the polyurethane elastomer to within a range of from about $1.0 \times 10^6$ to about $5.0 \times 10^{11}$ ohm cm, and more preferably, from about $2.0 \times 10^8$ to about $2.0 \times 10^{10}$ ohm cm. The polyurethane elastomers can be crosslinked or non-crosslinked. If a crosslinked polyurethane is desired, such an elastomer readily can be formed by using an excess of polyisocyanate compound in preparing the elastomer or by utilizing a polyisocyanate, a polyol and/or a polyamine having a functionality greater than two in preparing the elastomer.

The polyisocyanate prepolymer can comprise recurring units derived from any suitable polyol with the proviso that the polyol is free of aliphatic unsaturation, including for example, amine-based polyols, polyether polyols, polyester polyols, mixtures thereof, and aromatic as well as saturated aliphatic and saturated cycloaliphatic polyisocyanates provided they do not adversely affect or in any way interfere with the relative humidity sensitivity or with the resistivity of the polyurethane in general. Exemplary polyisocyanate compounds which may be used to make the prepolymer are exemplified by those disclosed in U.S. Pat. Nos. 2,969,386 and 4,476,292, such as 4,4'-methylenediphenylene diisocyanate; 1,5-naphthalene diisocyanate; 3-isocyanatomethyl 3,5,5-trimethylcyclohexyl isocyanate (isophorone diisocyanate); methylenebis(4-isocyanatocyclohexane); hexamethylene diisocyanate; 1,3-cyclohexane bis(methylisocyanate); 2,2,4-trimethyl-hexamethylene diisocyanate, toluene diisocyanate and combinations thereof as well as related saturated aliphatic, saturated cycloaliphatic and aromatic polyisocyanates which may be substituted with other organic or inorganic groups that do not adversely affect the course of the polymerization reaction or interfere with the relative humidity sensitivity or with the resistivity of the polyurethane in general.

The term "aliphatic", as used herein includes those carbon chains which are substantially non-aromatic in nature. They must be saturated; however, they may be unbranched, branched or cyclic in configuration and may contain various substituents. Exemplary of long chain aliphatic polyisocyanates are dodecane diisocyanate, tridecane diisocyanate, and the like.

The term "aromatic" as used herein, includes a diatropic moiety derived from benzene, naphthalene, anthracene, phenanthrene, biphenyl and the like. They may be unsubstituted or substituted, for example, with halo, nitro, saturated alkyl, saturated alkoxy, saturated alkylthio or aryl substituents. Included in this definition also are alkylene diarylene structures, for example, methylenediphenylene and ethylenediphenylene. Exemplary of aromatic diisocyanates are toluene-2,4-diisocyanate, m-phenylene diisocyanate, methylene-di-p-phenylene diisocyanate and the like.

Polyols useful in preparing the polyisocyanate prepolymer and finished polyurethane elastomers are, as previously described, any suitable polyol free of aliphatic unsaturation which will not interfere with the relative humidity sensitivity or with the resistivity of the polyurethane composition or otherwise adversely affect the properties and/or the performance of the polyurethane elastomer in effecting optimal image transfer of the biasable member on which the polyurethane is coated and can include, for example, amine-based polyols, polyether polyols, polyester polyols and mixtures thereof. Examples of such polyols are disclosed in U.S. Pat. Nos. 2,969,386; 3,455,855; 4,476,292 and 4,390,679. One preferred group of polyols are aliphatic polyols and glycols such as glycerol, trimethylolpropane, 1,3-butylene glycol, 1,4-butylene glycol, propylene glycol, hydroxylated castor oils, polyethers such as poly(tetramethylene glycols) and poly(propylene glycols), low molecular weight polyester polyols, such as polyethylene adipate, and a poly-(caprolactone)diol.

A particularly useful polyol which can be used to prepare the polyisocyanate prepolymer and/or chain extend the prepolymer to the final conductive bulk polyurethane is an alkylene glycol polymer having an alkylene unit composed of at least two carbon atoms, preferably 2 to 8 carbon atoms. These alkylene glycol polymers are exemplified by poly-(ethylene glycol), poly(propylene glycol) and poly(tetramethylene glycol). Di-, tri-, and tetrafunctional compounds are available with the trifunctional ones being exemplified by the reaction product of glycerol or trimethylolpropane and propylene oxide. A typical polyether polyol is available from Union Carbide under the designation PPG-425. Also, another polyether polyol suitable for use in preparing the polyurethane materials of the present invention is a trimethylolpropane based polyfunctional polyol available from Dow Chemical Co. as Voranol™.

Another group of polyols are amine-based polyols. A wide variety of aromatic and aliphatic diamines may form part of the amine-based polyols. Such polyols include N,N, N'N'-tetrakis(2-hydroxypropyl)ethylenediamine and a polymer of ethylene diamine, propylene oxide and ethylene oxide. A typical aromatic amine-based polyol is available from Upjohn under the designation ISO-NOL 100; a typical aliphatic amine-based polyol is available from BASF under the designation QUADROL and a typical ethylene diamine/propylene oxide/ethylene oxide polymer is available from BASF under the designation PLURACOL 355.

In general, suitable polyols useful for preparing the prepolymer and/or chain extending the prepolymer to the final conductive bulk polyurethane will have molecular weights of from about 60 to 10,000, typically, from about 500 to 3,000.

Preferred concentration ranges for the respective components of the prepolymer are 5–40% by weight of polyisocyanate and 60–95% by weight polyol, based on the total weight of the prepolymer, to form a resin prepolymer.

The final conductive bulk polyurethane elastomer is produced by chain extending and/or crosslinking the prepolymer with a hardener composition comprising at least one additional polyol or blends of polyols of the type aforedescribed and discussed hereinabove and the conductivity control agents described hereinbefore.

The polyol hardener system comprises at least one polyol of the type aforedescribed, such as, for example, an amine-based polyol or a polyether polyol previously identified and defined hereinabove or blends of these polyols.

Preferred polyols are poly(tetramethylene glycol) and a trimethylolpropane based polyfunctional polyol available from Dow Chemical Co. as Voranol™ having added thereto about 0.001 to about 5.0 weight percent, based on the total weight of the polyurethane elastomer, of an ionic conductivity control agent as described hereinbefore.

Alternatively, in lieu of, or in addition to, utilizing a polyol of the type and kind described hereinabove in the hardener compositions used to form the presently described polyurethane elastomers, an aliphatic or cycloaliphatic diamine free of aliphatic unsaturation or an aromatic diamine free of aliphatic unsaturation can be used in the hardener composition provided they do not interfere with the relative humidity sensitivity or with the resistivity of the polyurethane elastomer composition or otherwise adversely affect the properties and/or the performance of the polyurethane elastomer in effecting optimal image transfer of the biasable member on which the polyurethane is coated along with the conductivity control agents described heretofore. Exemplary diamines which can be used in the hardener compositions of the present invention include 4,4'-methylenebis(o-chloroaniline), phenylenediamine, bis(4-aminocyclohexyl)methane, isophoronyldiamine, and the reaction products of anhydrides with such amines as described in U.S. Pat. No. 4,390,679. Especially useful diamines are 4,4'-methylenebis(o-chloroaniline), diethyltoluenediamine available commercially from Ethyl Corporation, 451 Florida Blvd., Baton Rouge, La. under the trade name Ethacure 100 and di(methylthio)-2,4-toluenediamine, also available commercially from Ethyl Corporation under the trade-name Ethacure 300.

Such diamines serve to chain extend the prepolymer to the final conductive bulk polyurethane. Suitable such diamines will typically have molecular weights ranging from about 60 to about 500, and are employed in the hardener compositions alone having added thereto from about 0.001 to about 5.0 weight percent based on the total weight of the polyurethane of a conductivity control agent described hereinabove or as a blend in combination with one or more of the aforedescribed polyol components in weight ratios of polyamine to polyol ranging from 1:1 to 1:10 having added thereto from about 0.001 to about 5.0 weight percent based on the total weight of the polyurethane of a conductivity control agent aforedescribed.

The polyurethanes are prepared by mixing the prepolymer with the polyol hardener.

In general, if the hardener contains stoichiometric equivalents of functional groups less than that contained in the prepolymer, a crosslinked polyurethane elastomer will result. On the other hand, if the hardener contains stoichiometric equivalents of functional groups greater than or equivalent to that contained in the prepolymer, then a non-crosslinked polyurethane elastomer will result. This only applies, however, if all the components in the prepolymer and the hardener are difunctional. If any component, either in the hardener composition or in the prepolymer composition has a functionality greater than two, then the resultant polyurethane elastomer will always be crosslinked.

Further, and if desired, instead of preparing the polyurethane elastomers of the present invention by first forming a polyisocyanate prepolymer and hardening mixture and then reacting the two together, all of the starting materials required to form the polyurethane elastomers of the present invention may simply be added together, reacted and cured in a "one-shot" method of preparation. Or, still further, the conductivity control agents described hereinabove may be added to the polyisocyanate prepolymer instead of the hardener and the prepolymer containing the conductivity control agent and the hardener reacted together to form the polyurethane elastomers of the present invention. If either of these two methods of preparation are used, amounts of conductivity control agent in the range of from about 0.001 to about 5.0 weight percent, based on the total weight of the resultant polyurethane, generally will be appropriate for adjusting the resistivity of the polymer elastomer to within the desired limits.

Optional additives or addenda which may be included in the hardener composition may comprise, for example, ethyl acrylate-2-ethylhexyl acrylate copolymer, dimethyl siloxane copolymers and other silicones such as SAG-47 commercially available from Union Carbide Company; antioxidants, such as esters of β-(3,5-di-tert-butyl-4-hydroxyphenyl)propionic acid with monohydric or polyhydric alcohols, for example methanol, octadecanol, 1,6-hexanediol, neopentyl glycol, thiodiethylene glycol, diethylene glycol, triethylene glycol, pentaerythritol, tris(hydroxyethyl)isocyanurate, and di(hydroxyethyl)oxalic acid diamide; UV absorbers and light stabilizers such as 2-(2'-hydroxyphenyl)benzyltriazoles and sterically hindered amines such as bis(2,2,6,6-tetramethylpiperidyl)sebacate, bis(1,2,2,6,6-pentamethylpiperidyl)sebacate, n-butyl-3,5-di-tert-butyl-4-hydroxybenzyl malonic acid, bis(1,2,2,6,6-pentamethylpiperidyl)ester, condensation product of 1-hydroxyethyl-2,2,6,6-tetramethyl-4-hydroxypiperidine and succinic acid, condensation product of N,N'-bis(2,2,6,6-tetramethylpiperidyl)hexamethylenediamine, and 4-tert-octylamino-2,6-dichloro-1,3,5-s-triazine, tris(2,2,6,6-tetramethylpiperidyl)nitrilotriacetate, tetrakis(2,2,6,6-tetramethyl-4-piperidyl)-1,2,3,4-butanetetracarbonic acid and 1,1'-(1,2-ethanediyl)-bis-3,3,5,5-tetramethylpiperazinone); plasticizers such as phthalates, adipates, glutarates, epoxidized vegetabe oils, and the like; fungicides, pigments, dyes; reactive dyes; moisture scavengers; and the like.

The prepolymer-hardener mixtures prior to curing, exhibit sufficiently low viscosities to facilitate mixing, pouring and air bubble diffusion, thereby allowing for the formation of bubble free castings in the configuration of a transfer roller or belt.

Two-component polyurethane mixes of the type described above into which the conductivity control agents of the invention can be incorporated are commercially available. Examples of such commercially available polyurethane systems include CONATHANE TU-500 and CONATHANE TU-400 available from Conap, Inc., Olean, N.Y., and a system sold by Winfield Industries, Inc., Buffalo, N.Y., under the trade name Winthane W643.

The degree of conductivity imparted to the polymer will vary depending primarily upon the amount of conductivity control agent included in the combination of starting materials and the inherent properties of the given polymer and crosslinking agent, if employed, (i.e., the degree of conductivity the polymer would have if no conductivity control agent were included). Any amount of the conductivity control agent sufficient to adjust or alter the resistivity of the elastomeric polyurethane material to within the desired limits, e.g., from higher levels of resistivity to a resistivity in the range of from about $1.0 \times 10^6$ to about $5.0 \times 10^{11}$ ohm cm, or within the range itself, may be used in accordance with the present invention. Resistivities in this range have been found to be consistent with optimal image transfer efficiency. In general, as mentioned previously, concentrations in the range of about 0.001 to 5.0 percent by weight, based on the total weight of the elastomeric polyurethane, have been found to be appropriate for adjusting the resistivity of the polymer to within the desired limits.

Higher amounts of the conductivity control agent may be used, however, to control the resistivity of the polyurethane elastomer, the only limitation being that the elastomeric polyurethane used as the coating material for the conductive substrate of the biasable transfer member possess the desired resistivity.

The conductivity control agent is simply included in the desired amount in the combination of starting materials, typically, but not necessarily, as a component of the hardener composition. When the conductivity control agent contains functional groups such as, for example, a hydroxyl group, the conductivity control agent will bond covalently to the polymer matrix, i.e., to the backbone and/or a crosslinking, and/or a branched portion of the polymer by reaction of the hydroxyl group, for example, with excess isocyanate present in the prepolymer/hardener mixtures which form urethane linkages in the polymer backbone and/or crosslinking and/or branched portions of the polymer during the normal process of elastomer preparation thereby firmly anchoring the conductivity control agent in the polymeric network.

The conductivity control agents which are incorporated into the polyurethane elastomers in accordance with the present invention for controlling or adjusting the resistivity of the polyurethane and for reducing the sensitivity of the resistivity of the polyurethane elastomers to changes in relative humidity are those salts represented by the formula:

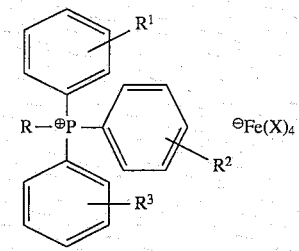

wherein

R is selected from an unsubstituted alkyl group having from 1 to 24 carbon atoms; a substituted alkyl group having from 1 to 24 carbon atoms substituted with one or more hydroxy-, alkoxy-, carboalkoxy-, nitro-, cyano-, keto- or halo-groups; a cycloalkyl group having from 3 to 7 carbon atoms; an alkaryl group having from 1 to 20 carbon atoms in the alkyl group and 6 to 14 carbon atoms in the aryl group; an aralkyl group having 1 to 4 carbon atoms in the alkyl group and 6 to 14 carbon atoms in the aryl group wherein the aryl group is substituted with one or more alkyl groups containing from 1 to 18 carbon atoms, one or more alkoxy groups containing from 1 to 12 carbon atoms, one or more hydroxy-, halo-, cyano-, amino-, or nitro-groups; or phenyl;

$R^1$, $R^2$ and $R^3$, which can be the same or different, are independently selected from hydrogen; an unsubstituted alkyl group having from 1 to 24 carbon atoms; a substituted alkyl group having from 1 to 24 carbon atoms substituted with one or more hydroxy groups, alkoxy groups containing from 1 to 12 carbon atoms, carboalkoxy groups containing from 1 to 12 carbon atoms, acyloxy groups containing from 1 to 12 carbon atoms, nitro-, cyano-, keto- or halo-groups; phenyl substituted with one or more hydroxy groups, alkoxy groups containing from 1 to 12 carbon atoms, carboalkoxy groups containing from 1 to 12 carbon atoms, acyloxy groups containing from 1 to 12 carbon atoms, nitro-, cyano-, keto- or halo-groups; and X, which can be the same or different, is independently selected from fluorine, chlorine, bromine or iodine.

Illustrative examples of unsubstituted alkyl groups as indicated herein include methyl, ethyl, propyl, isopropyl, butyl, isobutyl, pentyl, hexyl, heptyl, decyl, dodecyl, pentadecyl, octadecyl, docosyl, and the like.

Illustrative examples of substituted alkyl groups as indicated herein include 2-hydroxyethyl, nitromethyl, chloromethyl, 2-bromoethyl, trichloromethyl, 2-iodopropyl, bromo-tert-butyl, 1,3,3-trichlorobutyl, 3,3-dibromopentyl, 3-chlorohexyl, 1,4-dichlorohexyl, 4-bromoctyl, 2-methoxyethyl, 3-oxobutyl, and the like.

Illustrative examples of cycloalkyl groups as indicated herein include cyclobutyl, cyclopentyl, cyclohexyl, and the like.

Illustrative examples of alkaryl groups as indicated herein include 4-methylphenyl, 4-tert-butylphenyl, 6-methyl-2-naphthyl, 2-fluorenyl, and the like.

Illustrative examples of aralkyl groups as indicated herein include benzyl, 2-phenylethyl, 3-phenylpropyl, 2-methylbenzyl, 3-methylbenzyl, 4-methylbenzyl, 3-butylbenzyl, 4-isobutylbenzyl, 3-decylbenzyl, 3-pentadecylbenzyl, 4-methoxybenzyl, 4-ethoxybenzyl, 4-n-butoxybenzyl, 4-heptyloxybenzyl, 2-hydroxybenzyl, 3-hydroxybenzyl, 2,4-dihydroxybenzyl, 4-bromobenzyl, 4-chlorobenzyl, 4-fluorobenzyl, 2,4-dichlorobenzyl, 2-nitrobenzyl, 4-nitrobenzyl, 2,4-dinitrobenzyl, 2-aminobenzyl, 4-aminobenzyl, 2,4-diaminobenzyl, 2-cyanobenzyl, 4-cyanobenzyl, 2,4-dicyanobenzyl, and the like.

Specific examples of salts useful in the practice of the present invention include, but are not limited to the following.

SPECIFIC SALTS methyl triphenylphosphonium tetrabromoferrate;
methyl triphenylphosphonium tetraiodoferrate;
methyl triphenylphosphonium tetrafluoroferrate;
ethyl triphenylphosphonium tetrachloroferrate;
ethyl triphenylphosphonium tetrabromoferrate;
ethyl triphenylphosphonium tetraiodoferrate;
ethyl triphenylphosphonium tetrafluoroferrate;
n-propyl triphenylphosphonium tetrabromoferrate;
n-butyl triphenylphosphonium tetrachloroferrate;
n-butyl triphenylphosphonium tetrabromoferrate;
isobutyl triphenylphosphonium tetrachloroferrate;
n-amyl triphenylphosphonium tetrabromoferrate;
isoamyl triphenylphosphonium tetrabromoferrate,
isoamyl triphenylphosphonium tetrafluoroferrate;
n-hexyl triphenylphosphonium tetrachloroferrate;
n-heptyl triphenylphosphonium tetrabromoferrate;
n-octyl triphenylphosphonium tetrabromoferrate;
n-nonyl triphenylphosphonium tetrachloroferrate;
n-decyl triphenylphosphonium tetrabromoferrate;
n-undecyl triphenylphosphonium tetrabromoferrate;
n-dodecyl triphenylphosphonium tetrabromoferrate;
n-tetradecyl triphenylphosphonium tetrabromoferrate;
n-hexadecyl triphenylphosphonium tetrachloroferrate;
2-chloroethyl triphenylphosphonium tetrabromoferrate;
2-chloroethyl triphenylphosphonium tetrafluoroferrate;
2-hydroxyethyl triphenylphosphonium tetrabromoferrate;
3-bromopropyl triphenylphosphonium tetrabromoferrate;
4-bromobutyl triphenylphosphonium tetrabromoferrate;
cyclopropylmethyl triphenylphosphonium tetrabromoferrate;
isopropyl triphenylphosphonium tetraiodoferrate;
2-butyl triphenylphosphonium tetrabromoferrate;
cyclopropyl triphenylphosphonium tetrabromoferrate;
cyclopentyl triphenylphosphonium tetrachloroferrate;
cyclohexyl triphenylphosphonium tetrabromoferrate;
cyclohexyl triphenylphosphonium tetrabromoferrate;
benzyl triphenylphosphonium tetrachloroferrate;
benzyl triphenylphosphonium tetrabromoferrate;
benzyl triphenylphosphonium tetraiodoferrate;
benyl triphenylphosphonium tetrafluoroferrate;
2-methylbenzyl triphenylphosphonium tetrachloroferrate;
2-methylbenzyl triphenylphosphonium tetrabromoferrate;
3-methylbenzyl triphenylphosphonium tetrachloroferrate;
4-methylbenzyl triphenylphosphonium tetrachloroferrate;
4-methylbenzyl triphenylphosphonium tetrabromoferrate;
4-methoxybenzyl triphenylphosphonium tetrachloroferrate;
4-methoxybenzyl triphenylphosphonium tetrafluoroferrate;
4-n-butoxybenzyl triphenylphosphonium tetrabromoferrate;
4-ethoxybenzyl triphenylphosphonium tetrabromoferrate;
2-hydroxybenzyl triphenylphosphonium tetrabromoferrate;
4-bromobenzyl triphenylphosphonium tetrabromoferrate;
4-chlorobenzyl triphenylphosphonium tetrachloroferrate;
4-fluorobenzyl triphenylphosphonium tetrachloroferrate;
2-nitrobenzyl triphenylphosphonium tetrabromoferrate;
4-nitrobenzyl triphenylphosphonium tetrabromoferrate;
4-cyanobenzyl triphenylphosphonium tetrachloroferrate;
tetraphenylphosphonium tetrachloroferrate;
tetraphenylphosphonium tetrabromoferrate;
tetraphenylphosphonium tetraiodoferrate;
methyl triphenylphosphonium bromotrichloroferrate;
ethyl triphenylphosphonium bromotrichloroferrate;
n-octyl triphenylphosphonium bromotriiodoferrate;
2-chlorohexyl triphenylphosphonium bromotrichloroferrate;
benzyl triphenylphosphonium bromotriiodoferrate;
cyclopropyl triphenylphosphonium bromotrichloroferrate;
methyl bis(4-carbomethoxyphenyl)phenylphosphonium tetrachloroferrate;
methyl bis(4-acetoxyphenyl)phenylphosphonium tetrachloroferrate;
methyl tris(4-acetoxyphenyl)phosphonium tetrachloroferrate and
methyltris(4-methoxyphenyl)phosphonium tetrachloroferrate
methyl tritolylphosphonium tetrachloroferrate;
methyl tris(4-chlorophenyl)phosphonium tetrachloroferrate;
methyl tris(4-carbomethoxyphenyl)phosphonium tetrachloroferrate;
methyl 4-acetoxyphenyldiphenylphosphonium tetrachloroferrate;
methyl 3,5-bis (4-carbomethoxy)phenyldiphenylphosphonium tetrachloroferrate;
4-carboethoxybutyl triphenylphosphonium bromotrichloroferrate;
3-phenylpropyl triphenylphosphonium bromotrichloroferrate, and
1-naphthylmethyl triphenylphosphonium tetrachloroferrate The phosphonium tetraholoferrate salts used as conductivity control agents in the practice of the present invention can conveniently be prepared from an appropriate phosphonium halide salt and an appropriate anhydrous iron halide such as ferric fluoride, ferric chloride or ferric bromide, by reacting the ammonium halide salt with the anhydrous iron halide in anhydrous methanol at a 1:1 mole ratio.

For example, benzyltriphenylphosphonium tetrachloroferrate can be prepared by dissolving benzyltriphenylphosphonium chloride together with ferric chloride, in the appropriate amounts in anhydrous methanol, heating the mixture to boiling, filtering the solution while hot and cooling the solution to obtain, as a solid crystalline material, benzyltriphenylphosphonium tetrachloroferrate salt.

As mentioned previously, the conductivity control agents used in the present invention for controlling or adjusting the resistivity of the polyurethane elastomers which form the coatings on the conductive substrates of the biasable transfer members of the invention also significantly reduce the sensitivity of the resistivity of the polyurethane to changes in the relative humidity.

The relative humidity sensitivities of the elastomeric polyurethanes used in the invention for making biasable transfer members by coating a conductive substrate for supporting a uniform bias potential thereon with at least one coating of the elastomeric polyurethane have been obtained by measuring the volume resistivity of the polyurethanes at a relative humidity of 0 percent and a relative humidity of 100 percent. The ratio of the resistivity at a relative humidity of 0 percent to the resistivity at a relative humidity of 100 percent is the relative humidity sensitivity. This relative humidity sensitivity also is referred to as the relative humidity swing. The ratio of the sensitivity at a relative humidity of 0 percent and a relative humidity of 100 percent should be about 1 to 12 to provide a suitable biasable transfer member in accordance with the present invention. Ideally, the ratio should be 1. As mentioned above, in addition to the desirability of having a low relative humidity swing, the elastomeric polyurethanes useful for biasable transfer members must also have a resistivity of from about $1.0 \times 10^6$ to about $5.0 \times 10^{11}$ ohm cm, and preferably from about $2.0 \times 10^8$ to about $2.0 \times 10^{10}$ ohm cm. In the event a particular elastomeric polyurethane has a resistivity higher than the desired resistivity, the resistivity may be adjusted by the inclusion of a suitable amount of conductivity control agent to adjust the resistivity of the particular polymeric material as described previously.

As mentioned previously, the hardness of the elastomeric polyurethanes of the invention is between about 10 Shore A to about 80 Shore D, and preferably about 15–100 Shore A. The control of the hardness is within the purview of those skilled in the art and the hardness can be controlled by such parameters as by varying the types and amounts of reactants used and by using various additives such as plasticizers.

In accordance with the invention, there is described the method of controlling the resistivity of a biasable transfer member. There also is described a method of reducing the sensitivity of the resistivity of the elastomeric polyurethanes used as coatings on a conductive substrate for supporting a uniform bias potential thereon to changes in relative humidity. The coating can be applied to the substrate by any suitable method or technique known in the art including spraying, casting in molds, affixing sheets of the material to the substrate member by suitable mechanical means or by suitable cement, and the like.

The following examples and comparative tests illustrate more clearly the elastomeric polyurethane materials which may be used in preparing the biasable transfer members of the present invention and for controlling the resistivity of the biasable transfer members of the present invention, including controlling the sensitivity of the resistivity to changes in relative humidity although the invention is not to be construed as limited in scope thereby.

SAMPLE PREPARATION

Slabs of the particular elastomeric polyurethanes to be tested were cast in a stainless steel mold in sheets to a thickness of 0.25 inch (0.635 cm). Samples of the various cast materials were placed in controlled humidity chambers for a designated number of days. One set of chambers was maintained at a relative humidity of 0 percent and another set of chambers was maintained at a relative humidity of 100 percent. A 0 percent relative humidity environment was obtained by suspending the test samples in a sealed jar containing 1-inch Drierite at 24° C. A 100 percent relative humidity environment was obtained by suspending the samples over water in a sealed jar at 24° C. The samples were suspended in the chambers in such a way that both sides were available to the atmosphere. In this manner, the samples would have taken up very close to the equilibrium amounts of water within 14 days. After 14 days, the volume resistivities of the samples were measured according to the procedure of ASTM Standard D-257 by placing the samples between two soft electrodes of a known surface area, applying a pressure of 20 psi and supplying a 1 kilovolt DC bias from a Trek 610C Cor-A-Trol (high voltage supply) to one electrode and measuring the current from the second electrode using a Kiethly 485 Picoammeter. Values are reported in ohm cm.

The resistivities measured at both 0 percent and 100 percent relative humidity were recorded. For the designated examples below, the ratio of the resistivity at 0 percent relative humidity to the resistivity at 100 percent relative humidity was determined. The resulting ratio was designated as the RH sensitivity or RH swing and is reported as RH sensitivity in Table I below where resistivity at 0 percent and 100 percent relative humidities also is designated for the various samples tested.

EXAMPLE 1

This example describes the preparation of a conductivity control agent useful in accordance with the invention which is benzyltriphenylphosphonium tetrachloroferrate.

Benzyltriphenylphosphonium tetrachloroferrate was prepared by adding in portions, with 25 ml anhydrous methanol rinse, 9.698 g (0.05979 mol) of ferric chloride to a 250 ml flask containing a solution of 23.25 g (0.05979 mol) of benzyltriphenylphosphonium chloride in 120 ml of anhydrous methanol, heating the mixture to boiling, filtering the mixture while hot through supercel, and cooling. The product crystallized as a yellow solid which was collected and dried to give 25.3 g (76.78% of theory) of product; mp=117°–117.5° C.

Anal. Calcd. for $C_{25}H_{22}Cl_4FeP$: C, 54.49; H, 4.02; P, 5.62, Cl, 25.73; Fe, 10.13. Found: C, 54.22; H, 4.01; P, 5.6; Cl, 25.36; Fe, 11.00.

EXAMPLE 2

This example describes the preparation of a crosslinked 35 Durometer Shore A hardness elastomeric polyurethane of the invention containing the conductivity control agent of Example 1.

To a one-liter plastic beaker containing 13.16 g (148.14 meq) of a trimethylolpropane based polyfunctional polyol obtained from Dow Chemical Co. as Voranol™, 0.50 g (1.2 mmole) of the benzyltriphenylphosphonium tetrachloroferrate conductivity control agent of Example 1 and two drops of a polydimethylsiloxane anti-foam agent obtained from Union Carbide Co. as SAG 47™, there were added 186.34 g (148.14 meg) of a polyester based polyurethane prepolymer obtained from Uniroyal Co. as Vibrathane™ which analyzed as a toluene diisocyanate/adipate/polypropylene glycol prepolymer. The reaction mixture was stirred at room temperature, under nitrogen, for two minutes, degassed under reduced pressure (0.1 mm Hg) and poured into a stainless steel mold. The polymer was cured at 100° C. for sixteen hours and demolded. The slab was then cooled to room temperature and the resistivities of the slab molded to a thickness of 0.25 in (0.635 cm) were measured as described above at the two designated relative humidities and the relative humidity sensitivity was determined after an equilibration time of fourteen days in a relative humidity chamber. The results are shown in Table I, Example 2 below.

COMPARATIVE EXAMPLE 3

This example describes the preparation of an elastomeric polyurethane outside the scope of the invention to show that the polyurethane elastomers of the present invention are superior to polyurethane elastomers of the prior art, specifically those described in U.S. Pat. No. 4,729,925 to Chen et al with respect to moisture stability. The example shows the preparation of a polyurethane elastomer made from a two-component polyurethane commercial mix obtained from Conap, Inc., Olean, N.Y., designated as CONATHANE TU-500 containing 0.075 weight percent of the conductivity control additive described in Example 10 of aforementioned U.S. Pat. No. 4,729,925, i.e., bis[oxydiethylenebis(polycaprolactone)yl]5-sulfo-1,3-benzenedicarboxylate, methyltriphenylphosphonium salt. The conductivity control agent was added to Part B of the polyurethane mix prior to the addition of Part B to Part A of the mix.

A Twin Flow Static Mixer obtained from Liquid Control Corp. was used as the mixing vessel. A total of 3255.25 g of Part A of the CONATHANE TU-500 mix was transferred to the mixer and degassed under high vacuum for 3 hours. A 500 g quantity of Part B of the CONATHANE TU-500 mix was placed in a beaker and 43.49 g of the polyol conductivity control agent prepared in accordance with the method of Example 10 in U.S. Pat. No. 4,729,925 was added to the CONATHANE TU-500 Part B with stirring. Stirring was continued via a magnetic stirrer until the mixture was completely homogeneous. The mixture was then combined with 2000 g of CONATHANE TU-500 Part B and stirred thoroughly. The combined 2500 g of CONATHANE TU-500 part B containing the 43.49 g of the polyol conductivity control agent described above was placed in the Twin Flow Mixer, degassed under high vacuum for about 1 hour and statically mixed with Part A of the CONATHANE TU-500 two-component mix prior to the molding operation. The weight ratio of CONATHANE TU-500 Part A to CONATHANE TU-500 Part B plus the conductivity control agent was 1.29 to 1.00. After mixing and degassing, the vacuum was removed and a portion of the solution of the statically mixed polyurethane was poured into a steel mold and placed in a hot air oven at 80° C. and cured for 3 hours. The slab was then removed from the mold and was post cured in a hot air oven for 16 hours at 80° C. The slab was removed from the oven and cooled to room temperature. As before, the resistivities were measured as described above at the two designated relative humidities and the relative humidity sensitivity was determined after an equilibration time of 14 days in a relative humidity chamber. The results are shown in Table I below, Example 3.

TABLE I

Humidity Sensitivities of the Polyurethane Elastomers of Examples 2–3

| Examples | Resistivity at Designated Relative Humidity | | Time (days) | RH Sensitivity |
| --- | --- | --- | --- | --- |
|  | 0% | 100% |  |  |
| Example 2 | $4.16 \times 10^8$ | $3.76 \times 10^7$ | 14 | 11.06 |
| Comparative Example 3 | $3.49 \times 10^{10}$ | $1.26 \times 10^9$ | 14 | 27.7 |

As shown in the Table I, a comparison of the relative humidity sensitivity and resistivity of the polyurethane elastomer of Example 3 containing the bis[oxydiethylenebis(polycaprolactone)yl]5-sulfo-1,3-benzenedicarboxylate, methyltriphenylphosphonium conductivity control agent of Example 10 in U.S. Pat. No. 4,729,925 to Chen et al with the relative humidity sensitivity and resistivity of the polyurethane elastomer of Example 2 containing a conductivity control agent of the present invention, clearly shows the substantial reduction in RH sensitivity when a conductivity control agent of the present invention is used to control the resistivity of a polyurethane elastomer as compared to the prior art conductivity control agents of Chen et al disclosed in U.S. Pat. No. 4,729,925.

Although Applicants have referred to the biasable member coating materials of the invention throughout as polyurethane materials, it is to be understood that in the strictest sense, when a polyamine is present in the hardening composition that the resultant elastomeric material is comprised of a polyurethane/polyurea elastomer.

The invention has been described in detail with particular reference to preferred embodiments thereof, but it will be understood that variations and modifications can be effected within the spirit and scope of the invention.

We claim:

1. A member for electrically cooperating with a conductive support surface to attract charged toner particles from the conductive support surface towards the member comprising a conductive substrate capable of supporting a uniform bias potential thereon and at least one coating comprising a resilient elastomeric polyurethane formed by reacting:

(a) a polyisocyanate prepolymer comprising the reaction product of:
  (i) a saturated aliphatic polyisocyanate, a saturated cycloaliphatic polyisocyanate or an aromatic polyisocyanate; and
  (ii) a polyol free of aliphatic unsaturation; and (b) a hardening mixture comprising:
  (i) a polyol of (a) (ii) or a diamine free of aliphatic unsaturation or a mixture thereof; and,
  (ii) as a conductivity control agent for controlling the resistivity of the elastomeric polyurethane, from 0.001 to 5.0 weight percent, based on the total weight of the polyurethane, of a phosphonium tetrahaloferrate salt represented by the formula:

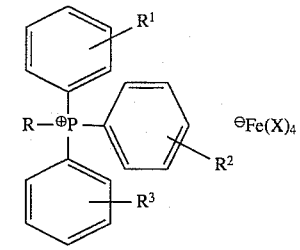

wherein

R represents an alkyl group having from 1 to 24 carbon atoms; a substituted alkyl group having from 1 to 24 carbon atoms substituted with one or more hydroxy-, alkoxy-, carboalkoxy-, nitro-, cyano-, keto- halogroups; a cycloalkyl group having from 3 to 7 carbon atoms; an alkaryl group having from 1 to 20 carbon atoms in the alkyl group and 6 to 14 carbon atoms in the aryl group; an aralkyl group having from 1 to 4 carbon atoms in the alkyl group and 6 to 14 carbon atoms in the aryl group wherein the aryl group is substituted with one or more alkyl groups containing from 1 to 18 carbon atoms, one or more alkoxy groups containing from 1 to 12 carbon atoms, one or more hydroxy-, halo-, cyano-, amino-, or nitro- groups; or phenyl;

$R^1$, $R^2$ and $R^3$, which can be the same or different, represents hydrogen; an unsubstituted alkyl group having from 1 to 24 carbon atoms; a substituted alkyl group having from 1 to 24 carbon atoms substituted with one more hydroxy groups, alkoxy groups containing from 1 to 12 carbon atoms, carboalkoxy groups containing from 1 to 12 carbon atoms, acyloxy groups containing from 1 to 12 carbon atoms, nitro-, cyano-, keto- or halo-groups; carbomethoxy, acetoxy, methoxy or chloro and X, which can be the same or different, is independently selected from fluorine, chlorine, bromine or iodine, the coating, being in electrical contact with the conductive substrate, and having an electrical resistivity of $1.0 \times 10^6$ to $5.0 \times 10^{11}$ ohm cm; a hardness between 20 Shore A to 80 Shore D and a thickness of 0.127 cm to 1.58 cm.

2. The member of claim 1, wherein the elastomeric polyurethane coating has a resistivity of from about $2.0 \times 10^8$ to about $2.0 \times 10^{10}$ ohm cm.

3. The member of claim 1, wherein the conductive substrate having a coating of elastomeric polyurethane is formed of a conductive metal in the shape of an endless belt.

4. The member of claim 1, wherein the conductive substrate having a coating of elastomeric polyurethane is formed of a conductive metal in the shape of a roll.

5. The member of claim 1, wherein (a) the polyisocyanate in the prepolymer is methylenebis(4-isocyanatocyclohexane), hexamethylene diisocyanate or toluene diisocyanate and (b) the polyol is poly(ethylene glycol), poly(propylene glycol), poly(tetramethylene glycol) or mixtures thereof.

6. The member of claim 1, wherein (a) the polyisocyanate in the prepolymer is methylenebis(4-isocyanatocyclohexane and (b) the polyol is poly(tetramethylene glycol).

7. The member of claim 1, wherein the conductivity control agent is benzyltriphenylphosphonium tetrachloroferrate.

8. The member of claim 1, wherein the conductive support surface comprises a photoconductor.

9. A method of controlling the resistivity of a member for electrically cooperating with a conductive support surface to attract charged toner particles fro the conductive support surface towards the member comprising coating a conductive substrate capable of supporting a uniform bias potential thereon with at least one coating of a resilient elastomeric polyurethane, said coating being in electrical contact with the conductive substrate and formed by reacting:

(a) a polyisocyanate prepolymer comprising the reaction product of:
  (i) a saturated aliphatic polyisocyanate, a saturated cycloaliphatic polyisocyanate or an aromatic polyisocyanate; and
  (ii) a polyol free of aliphatic unsaturation; and
(b) a hardening mixture comprising:
  (i) a polyol of (a) (ii) or a diamine free of aliphatic unsaturation or a mixture thereof; and,
  (ii) as a conductivity control agent for controlling the resistivity of the elastomeric polyurethane, from 0.001 to 5.0 weight percent, based on the total weight of the polyurethane, of a phosphonium tetrahaloferrate salt represented by the formula:

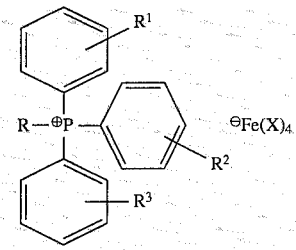

wherein

R represents an unsubstituted alkyl group having from 1 to 24 carbon atoms; a substituted alkyl group having from 1 to 24 carbon atoms substituted with one or more hydroxy-, alkoxy-, carboalkoxy-, nitro-, cyano-, keto- or halo-groups; a cycloalkyl group having from 3 to 7 carbon atoms; an alkaryl group having from 1 to 20 carbon atoms in the alkyl group and 6 to 14 carbon atoms in the aryl group; an aralkyl group having from 1 to 4 carbon atoms in the alkyl group and 6 to 14 carbon atoms in the aryl group wherein the aryl group is substituted with one or more alkyl groups containing from 1 to 18 carbon atoms, one or more alkoxy groups containing from 1 to 12 carbon atoms, one or more hydroxy-, halo-, cyano-, amino-, or nitro- groups; or phenyl;

$R^1$, $R^2$ and $R^3$, which can be the same or different, represent hydrogen; an unsubstituted alkyl group having from 1 to 24 carbon atoms; a substituted alkyl group having from 1 to 24 carbon atoms substituted with one more hydroxy groups, alkoxy groups containing from 1 to 12 carbon atoms, carboalkoxy groups containing from 1 to 12 carbon atoms, acyloxy groups containing from 1 to 12 carbon atoms, nitro-, cyano-, keto- or halo-groups; carbomethoxy, acetoxy, methoxy or chloro; and X, which can be the same or different, is independently selected from fluorine, chlorine, bromine or iodine, wherein the elastomeric polyurethane coating has an electrical resistivity of $1.0 \times 10^6$ to $5.0 \times 10^{11}$ ohm cm; a hardness between 20 Shore A to 80 Shore D and a thickness of 0.127 to 1.58 cm.

10. The method of claim 9, wherein the resistivity of the elastomeric polyurethane having the conductivity control agent included therein is from about $2.0 \times 10^8$ to about $2.0 \times 10^{10}$ ohm cm.

11. The method of claim 9, wherein the resistivity is increased.

12. The method of claim 9, wherein the resistivity is decreased.

13. The method of claim 9, wherein (a) the polyisocyanate in the prepolymer is methylenebis(4-isocyanatocyclohexane), hexamethylene diisocyanate or toluene diisocyanate and (b) the polyol is poly(ethylene glycol), poly(propylene glycol), poly(tetramethylene glycol) or mixtures thereof.

14. The method of claim 9, wherein (a) the polyisocyanate in the prepolymer is methylenebis(4-isocyanatocyclohexane) and (b) the polyol is poly(tetramethylene glycol).

15. The method of claim 9, wherein the conductive support surface comprises a photoconductor.

16. The method of claim 9, wherein the conductivity control agent is benzyltriphenylphosphonium tetrachloroferrate.

* * * * *